US007054958B2

United States Patent
Iyer et al.

(10) Patent No.: US 7,054,958 B2
(45) Date of Patent: May 30, 2006

(54) APPARATUS AND METHOD FOR RESPONDING TO A INTERRUPTION OF A PACKET FLOW TO A HIGH LEVEL DATA LINK CONTROLLER IN A SIGNAL PROCESSING SYSTEM

(75) Inventors: Ramesh A. Iyer, San Jose, CA (US); Henry D. Nguyen, Houston, TX (US); Patrick J. Smith, Houston, TX (US); Jay B. Reimer, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 139 days.

(21) Appl. No.: 10/001,153

(22) Filed: Nov. 14, 2001

(65) Prior Publication Data

US 2003/0093603 A1 May 15, 2003

(51) Int. Cl.
*G06F 13/28* (2006.01)

(52) U.S. Cl. ............................. 710/22; 710/33; 710/48; 710/52; 710/260; 709/212

(58) Field of Classification Search ................ 710/260, 710/33, 48, 22, 52; 709/212
See application file for complete search history.

(56) References Cited

U.S. PATENT DOCUMENTS

| | | | | |
|---|---|---|---|---|
| 4,543,627 A | * | 9/1985 | Schwab | 709/212 |
| 5,584,010 A | * | 12/1996 | Kawai et al. | 711/117 |
| 5,799,207 A | * | 8/1998 | Wang et al. | 710/38 |
| 5,828,856 A | * | 10/1998 | Bowes et al. | 710/308 |
| 5,838,934 A | * | 11/1998 | Boutaud et al. | 710/305 |
| 5,878,279 A | * | 3/1999 | Athenes | 710/40 |
| 6,275,877 B1 | * | 8/2001 | Duda | 710/23 |
| 6,374,313 B1 | * | 4/2002 | Popat | 710/52 |
| 6,487,643 B1 | * | 11/2002 | Khare et al. | 711/150 |
| 6,701,388 B1 | * | 3/2004 | Smith et al. | 710/22 |
| 6,823,402 B1 | * | 11/2004 | Smith et al. | 710/22 |
| 2003/0093594 A1 | * | 5/2003 | Smith et al. | 710/48 |

* cited by examiner

*Primary Examiner*—Tim Vo
*Assistant Examiner*—Christopher A Daley
(74) *Attorney, Agent, or Firm*—William W. Holloway; W. James Brady; Frederick J. Telecky, Jr.

(57) ABSTRACT

In a data processing system including a plurality of digital signal processor subsystems, selected peripheral components are shared by the digital signal processor subsystems. In particular, the high level data link controller is shared by the subsystems. Using a first interrupt signal after each transfer of signal groups from the peripheral direct memory access unit, the data can be efficiently transferred from a channel memory of the peripheral direct memory access unit to the high level data link controller. A second interrupt from the high level data link controller when a last word of a packet is transferred thereto causes a new channel memory to be accessed. An abort signal is generated when a signal group for a packet being processed by the high level data link controller is not available in a timely manner.

15 Claims, 9 Drawing Sheets

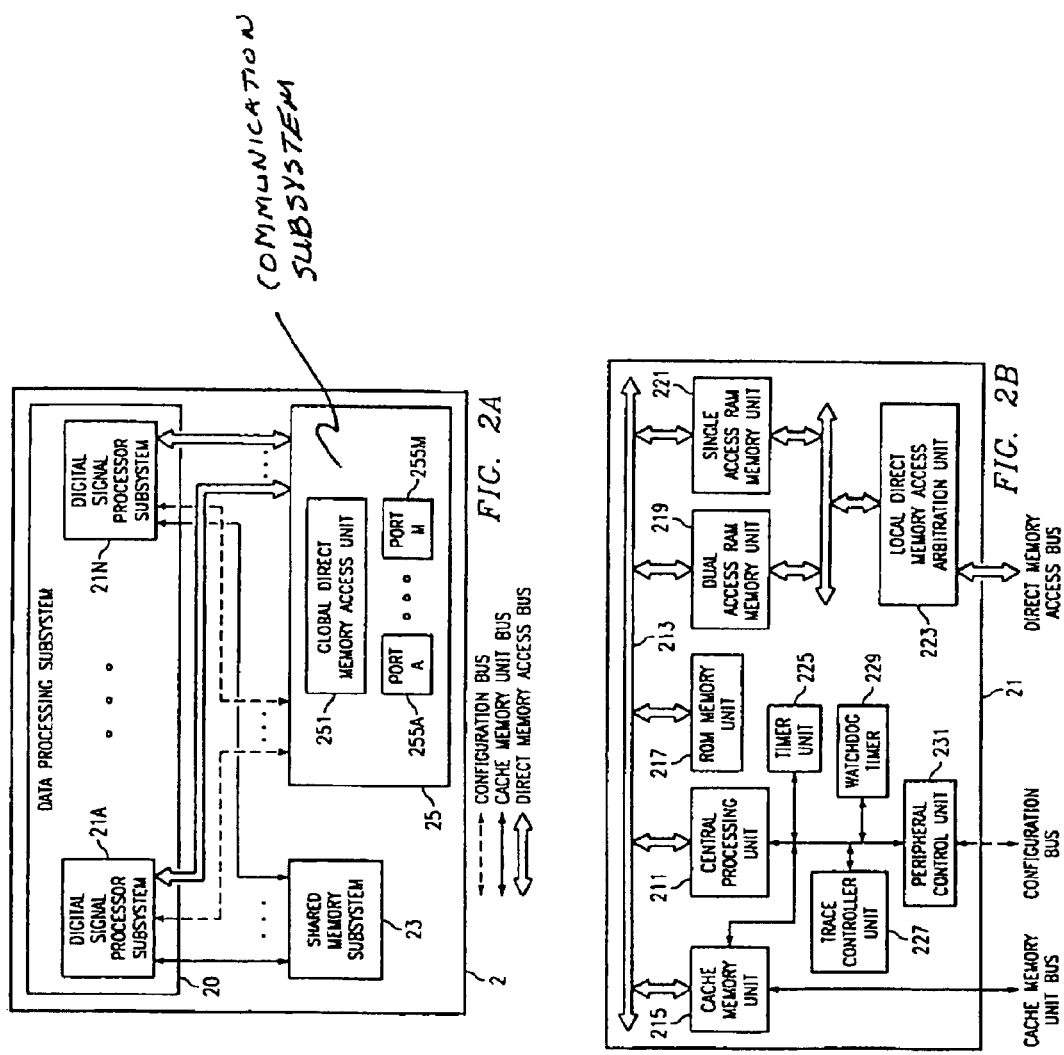

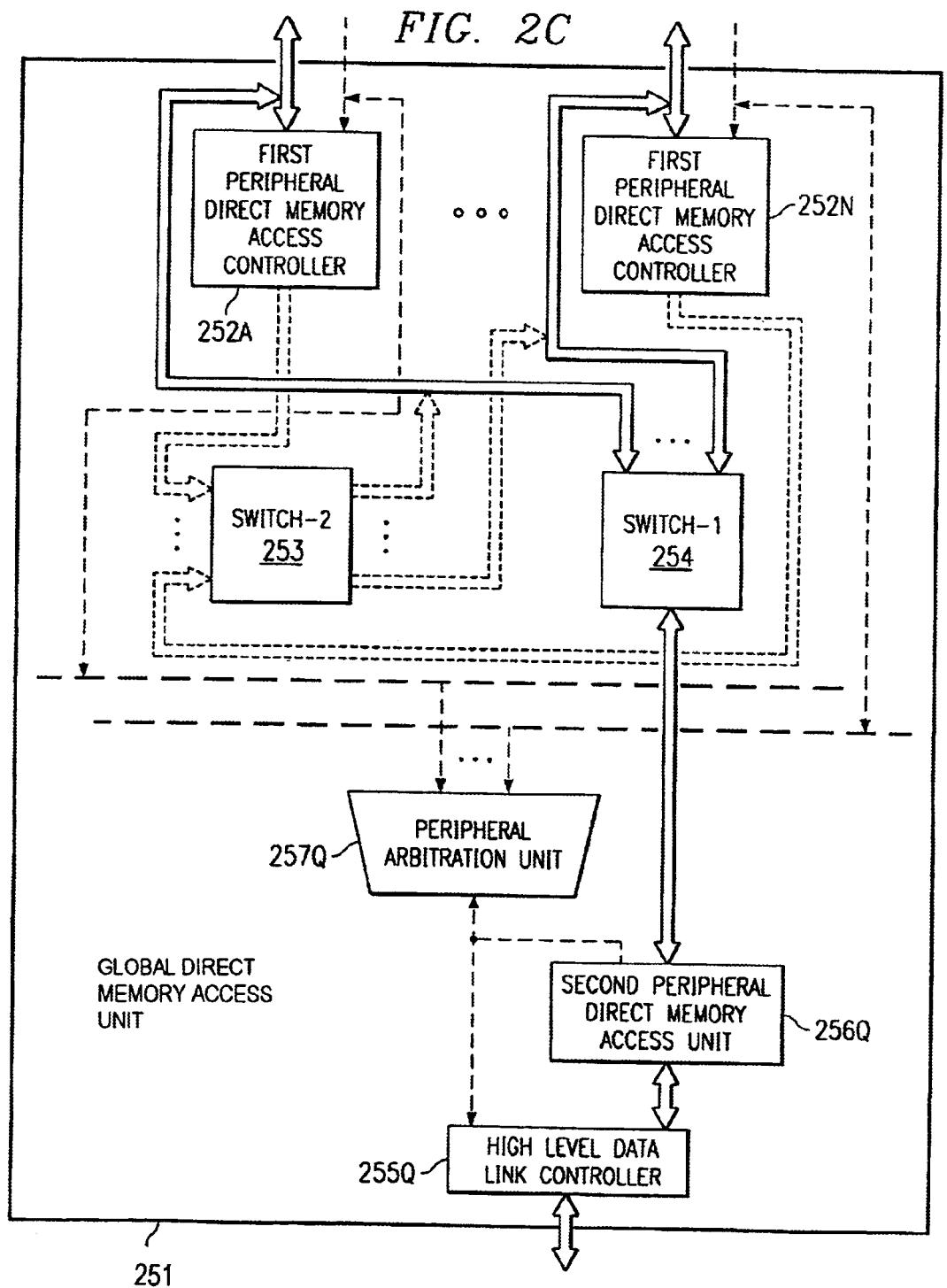

APPARATUS AND METHOD FOR RESPONDING TO A INTERRUPTION OF A PACKET FLOW TO A HIGH LEVEL DATA LINK CONTROLLER IN A SIGNAL PROCESSING SYSTEM

RELATED APPLICATIONS

U.S. patent application Ser. No. 10/001,152, entitled APPARATUS AND METHOD FOR DISTRIBUTION OF SIGNALS FROM A HIGH LEVEL DATA LINK CONTROLLER TO MULTIPLE DIGITAL SIGNAL PROCESSOR CORES, invented by Patrick J. Smith, Jay B. Reimer, Raxnesh A. Iyer, and Henry D. Nguyen, filed on even date herewith and assigned to the assignee of the present Application and U.S. patent application Ser. No. 10/000,990, entitled APPARATUS AND METHOD FOR CONTROLLING BLOCK SIGNAL FLOW IN A MULTI DIGITAL SIGNAL PROCESSOR CONFIGURATION FROM A SHARED PERIPHERAL DIRECT MEMORY CONTROLLER TO HIGH LEVEL DATA LINK CONTROLLER, invented by Patrick J. Smith, Jay B. Reimer, Raznesh A. Iyer and Henry D. Nguyen, filed on even date herewith and assigned to the assignee of the present Application are related Applications.

BACKGROUND OF THE INVENTION

1. Field of the Invention

This invention relates generally to data processing systems and, more particularly, to data processing systems having multiple digital signal processor subsystems exchanging data using a high level data link controller. The high level data link controller processes a plurality of signal groups and transmits the signal groups as a packet of signals. The invention relates to the flow of signal groups from a direct memory access unit to a high level data link controller.

2. Background of the Invention

As the applications to which the digital signal processor has been applied have increased in magnitude and complexity, the need for greater computational power has similarly increased. One response to the requirement of additional computational power has been to provide a plurality of digital signal processor subsystems on a chip. The requirement for additional computational power has also resulted in an increased need for the exchange of signal groups between the plurality of processors and the external components. Several ports have been developed to provide for this signal group exchange. For example, a serial port can be provided that can participate in the exchange of signal groups with other digital signal processors and a host processor. Similarly, a port can be provided that can provide signal group exchange with peripheral units. And a high level data link controller port can been provided that permits the exchange of packets of signals used in communication applications.

Referring to FIG. 1, a digital signal processor system 1 having a plurality of digital signal processor subsystems 10(1) through 10(N), according to the prior art, is shown. Each digital signal processor subsystem 10(1) includes a central processing unit (digital signal processor core) 101 and a memory unit 103. The central processing unit 101 processes signal groups stored in the memory unit 103 and exchanges signals therewith. The direct memory access unit 105 is coupled to the memory unit 103 and permits the exchange of signals between the memory unit 103 and external components without impact upon the performance of the central processing unit 101. The central processing unit 101 is also coupled to a host port interface unit 115. The host port interface unit 115 enables the central processing unit 101 to communicate with the host processing unit (not shown). Coupled to the direct memory access unit 105 typically are a multi-channel buffered serial port 107, a peripheral component interface unit 109 and high level data link controller unit 111. The multi-channel buffered serial port 107 exchanges signal groups in a serial format with the host computer unit and off-chip devices. The peripheral component interface unit 109 permits the exchange of signals with off-chip peripheral devices. The high level data link controller 111 permits the exchange of packets of signal groups, typically used in communication protocols, with off chip components.

As will be clear from FIG. 1, the subsystems 10(1) through 10(N) operate independently. Thus, a complete set of interface units to exchange signal groups with off chip components must be supplied for each subsystem 10(1) through 10(N) to insure that the operation of each subsystem 10(1) through 10(N) will not be limited. However, the result of provision of a complete set of interface units with each subsystem is an inefficient use of the semiconductor material and components.

A need has been felt for apparatus and an associated method having the feature of reducing component redundancy resulting from the duplication of components of the digital signal processor subsystems. The apparatus and associated method would have the more particular feature of reducing the number of interface components on the chip. It would be yet another feature of the apparatus and associated method that the subsystems on the chip would share interface components. It would be a still further feature of the apparatus and associated method that a single high level data link controller can process and transmit signal packets from a plurality of digital signal processing subsystems. It would be still a further feature of the apparatus and associated method to provide an efficient transfer of packets from the digital signal processing subsystems to the high level data link controller. It would be yet a further feature of the apparatus and associated method to respond to an interruption in the transmission of a signal packet. It would be yet a further feature of the apparatus and associated method to recover from an interruption in the processing and transmission of a signal packet with a minimum impact on the performance of the data processing system.

SUMMARY OF THE INVENTION

The aforementioned and other features are accomplished, according to the present invention, by providing a data processing subsystem having a plurality of digital signal processor subsystems, a shared memory subsystem, and a global direct memory access subsystem on a chip. Each digital signal processing subsystem includes a central processing unit and a memory unit. The global direct memory access unit includes a peripheral direct memory access unit and high level data link controller. A switch in the global direct memory access unit applies the signal groups from the memory unit of the digital signal processor subsystem to be converted by the high level data link to a peripheral direct memory access unit. From the peripheral direct memory access unit, the signal groups are transferred to the high level data link controller. The high level data link controller includes a FIFO memory that receives signal groups from a plurality of storage units in the peripheral direct memory access unit. The high level data link controller reads signal groups from a location in the FIFO memory unit and transmits the signal groups as part of a packet. When a space is available in the FIFO memory unit, a first INTERRUPT signal causes the next sequential signal group in the peripheral direct memory access unit associated with the packet being processed to be transferred to the FIFO memory unit. When the last signal group associated with the packet being processed is entered in the FIFO memory unit, a second INTERRUPT signal from the high level data link controller to the peripheral direct memory access unit causes a first signal group associated with a next packet to be addressed and a first INTERRUPT signal causes this addressed packet to be transferred to the FIFO memory unit for processing. When an interruption in the flow of signal groups from the peripheral direct memory access unit to the FIFO memory unit results in a void in the packet, then an ABORT signal is provided to the digital signal processing component issuing the aborted packet. In addition, a message is sent to the address to which the packet is being sent indicated the previous (incomplete) packet should be disregarded.

BRIEF DESCRIPTION OF THE DRAWINGS

FIG. 2A is a block diagram of a block diagram of the subsystems of a data processing subsystem having a plurality of digital signal processor subsystems capable of advantageously using the present invention; FIG. 2B illustrates the components of the digital signal processor subsystem in FIG. 2A; and FIG. 2C illustrates the components of the global direct memory access unit of FIG. 2A.

DESCRIPTION OF THE PREFERRED EMBODIMENTS

1. Detailed Description of the Figures

Figure 1:
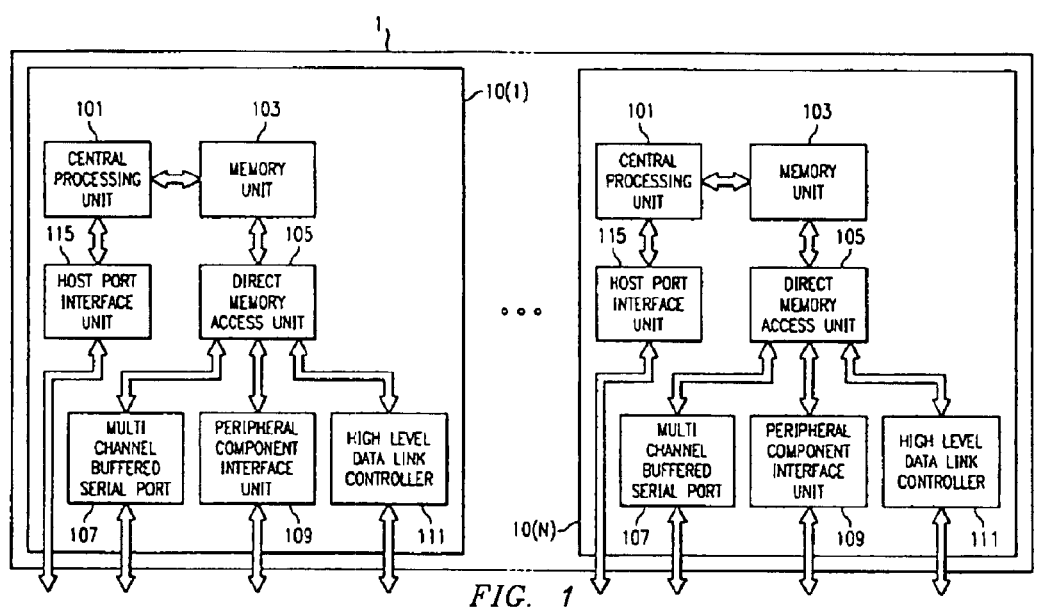
FIG. 1 is a block diagram of a digital signal processor system having a plurality of digital signal processors according to the prior art.

FIG. 1 has been described with respect to the related art.

Referring to FIG. 2A, a block diagram illustrating the subsystems of a data processing system 2 capable of advantageously using the present invention is shown. The data processing system 2 includes a data processing subsystem 20, a shared memory subsystem 23 and a communication subsystem 25. The data processing subsystem 20 includes a plurality of digital signal processing subsystems 21A through 21N. The communication subsystem includes a global direct memory access unit 251 and a plurality of signal exchange ports 25A through 25M. Each digital signal processor subsystem 21A through 21N is coupled to the shared memory subsystem 24 by a cache memory unit bus represented by a solid line. Each digital signal processor subsystem 21A through 21N is coupled to the communication subsystem 25 by a configuration bus represented by a dotted line and each digital signal processor subsystem 21A through 21N is coupled to the communication subsystem 25 by a direct memory access bus represented by a double solid line.

Referring to FIG. 2B, the principal components of the digital signal processor subsystems 21A through 21N are shown. The digital signal processor subsystem includes a central processing unit 211 coupled to a central processing unit bus 213. The central processing unit bus 213 is coupled to cache memory unit 215, to ROM memory unit 217, to dual access RAM memory unit 219, and to single access RAM memory unit 221. The dual access RAM memory unit 219 and the signal access RAM memory unit 221 are coupled to local direct memory access arbitration unit 223. The local direct memory access arbitration unit 223 is an interface to a plurality of components of the direct memory access bus, i.e., to the communication subsystem. The cache memory unit 215 is coupled to the cache memory unit bus and therefore to the shared memory subsystem 24. The central processing unit is coupled to the timer unit 225, the watchdog timer unit 229, to the trace controller unit 227 and to the peripheral control unit 231. The central processing unit 211 is coupled to timer unit 224, to the watchdog timer unit 229, to the trace controller unit 227, and to the peripheral control unit 231. The peripheral control unit 231 is coupled through the configuration bus to the communication subsystem 25.

Referring to FIG. 2C, the principal components of the global direct memory access unit 251 of the communication subsystem 25, as it relates to the present invention, are illustrated. Each digital signal processor subsystem 21A through 21N has associated therewith a first peripheral direct memory access unit 252A through 252N, respectively. Each first direct memory access unit 252A through 252N has the direct memory unit access bus and the configuration bus from the associated digital signal processor subsystem 21A through 21N, respectively, coupled thereto. The direct memory access bus coupled to each digital signal processor subsystem 21A through 21N is also coupled the input terminals of switch-1 254. Data groups from the local direct memory access units 223A through 223N can be applied to the associated first peripheral direct memory access unit 252A through 252N and to the switch-1 254. The first peripheral direct access memory unit 242A through 252N are related to the transfer of signal groups between the dual access RAM memory unit 219 and the single access RAM memory unit 221 of a first digital signal processing unit and the dual access RAM memory unit 219 and single access RAM memory unit 221 of a second digital signal processing unit or an external device. The switch-1 254 is coupled to a second peripheral direct memory access unit 256Q. The second direct memory access unit 256Q is coupled to the high level data link controller 255Q. The high level data link controller 255Q is one of a plurality of interface o units that exchanges signal groups/packets with the external components. In the present invention, the focus is on the transfer of signal groups from the digital signal processor subsystems 21A through 21N to the high level data link controller 255Q. Control signals are provided from the digital signal processor subsystems 21A through 21N to the global direct memory access unit 25 by the configuration bus (cf. FIG. 2A). In FIG. 2C, the configuration bus from each digital signal processor subsystem 21A through 21N is coupled to peripheral arbitration unit 257Q. The peripheral arbitration unit 257Q applies control signals to the second peripheral direct memory access unit 256Q and to the high level data link controller 255Q. A peripheral arbitration unit and a second peripheral direct memory access controller are associated with each of the interface units or ports.

Figure 3:
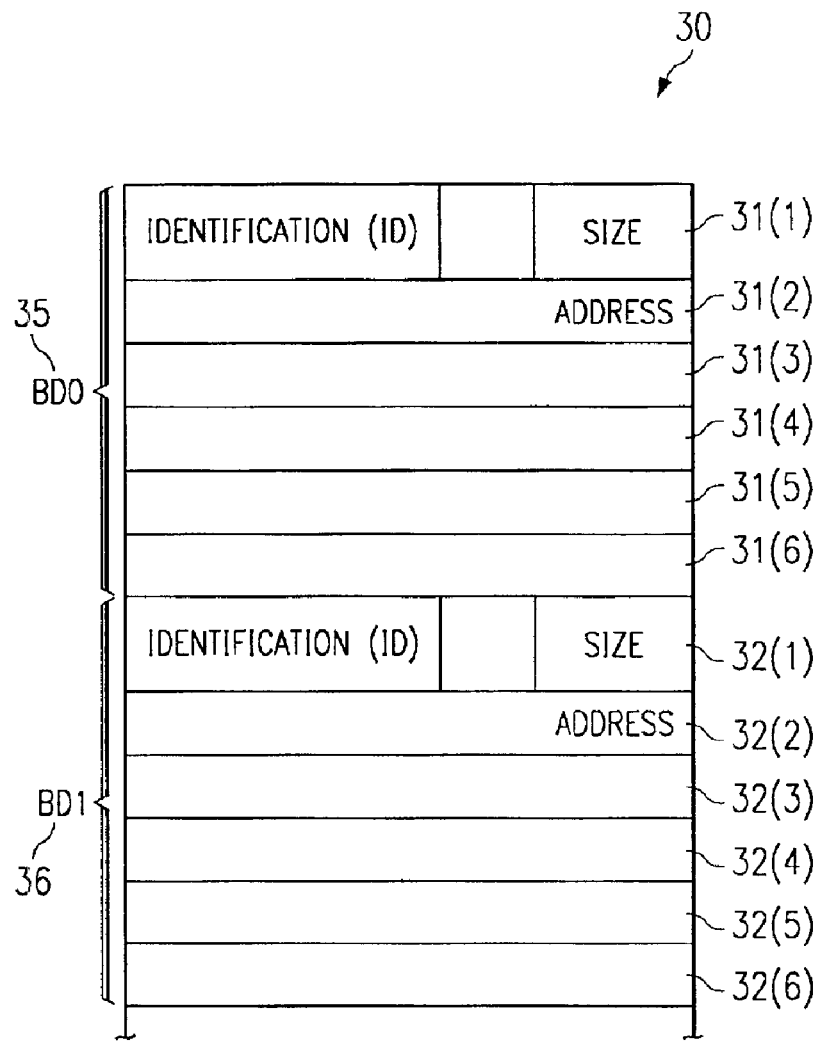
FIG. 3 illustrates the format of the blocks of data processed by the high level data link controller according to the present invention.

Referring to FIG. 3, the format of the data files applied to the high level data link controller and used by the high level data link controller to form signal packets is shown. The files are formed, in the preferred embodiment, by blocks of data. In FIG. 3, two data blocks BD0 35 and BD1 36, are shown. The data block BD0 35 is comprised of a multiplicity of groups of data signals, BD0 35 comprising signal groups 31(1) through 31(6), each signal group 4 bytes in length. The data block BD1 36 is comprised of signal groups 32(1) through 32(N), each signal groups 4 bytes in length. The first data group in each block of data is the header and includes identification (ID) information and the size of the data block, i.e., the number of groups of bytes. In the second signal group is found the address to which the data block is directed.

Figure 4A:
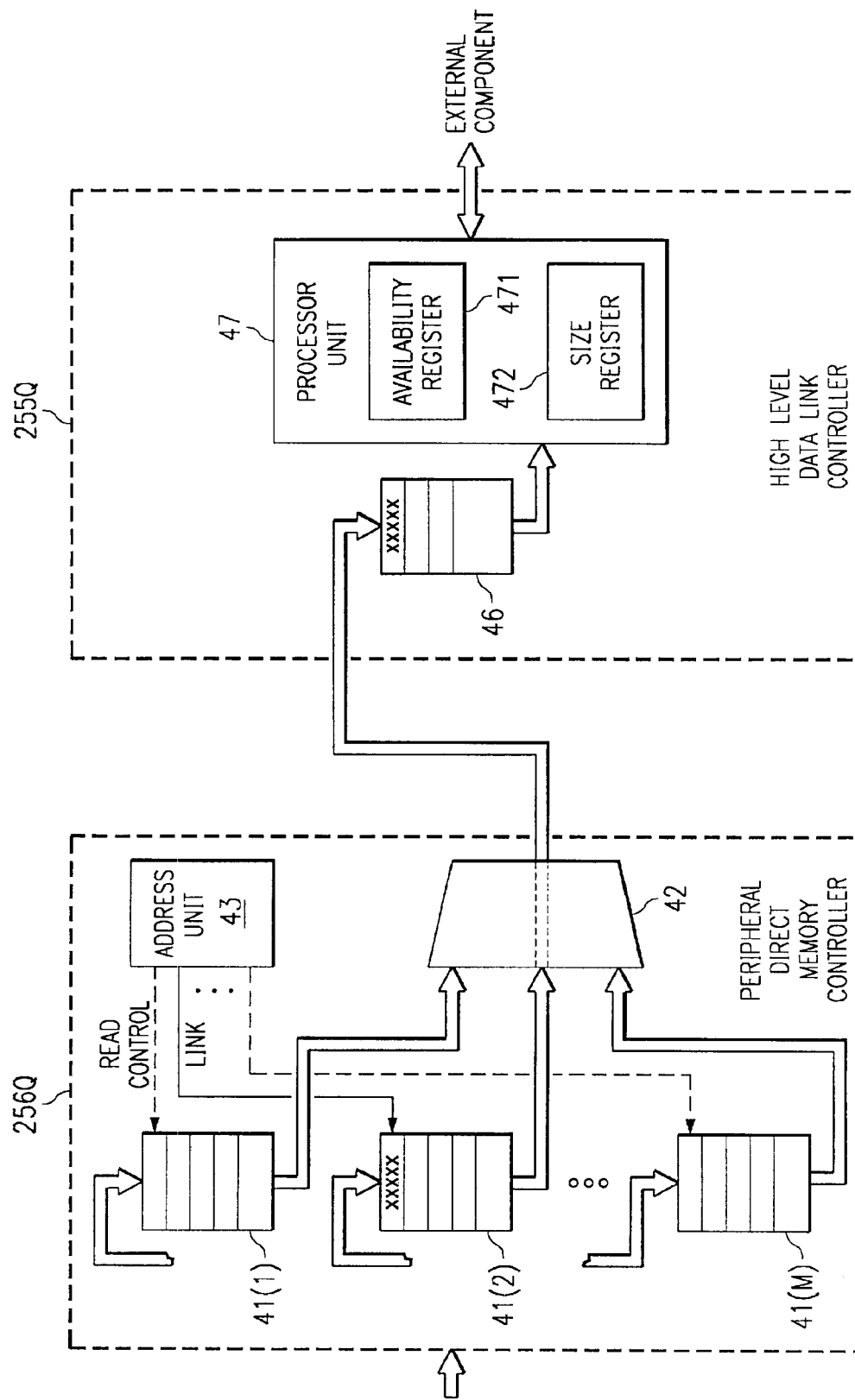
FIG. 4A illustrates the transfer of a packet signal group from a channel memory unit in a peripheral direct access memory unit to the FIFO memory unit in the high level data link controller after a system reset according to the present invention.

Referring to FIG. 4A, the process for transferring the blocks of data from the second peripheral direct memory access unit 256Q to the high level data link controller 255Q is shown. The peripheral direct memory access unit 255Q has a plurality of memory channels 41(1) through 41(M). When the digital signal processor subsystem is to transfer a block of data, i.e., data having the format of packet in FIG. 3, each word is transferred to the channel memory 41(1) through 41(M) associated with the originating digital signal processor subsystem 20(1) through 20(N). Each channel memory 41(1) through 41(M) is a first in, first out (FIFO) channel memory unit. The high level data link controller 255Q includes a FIFO memory 46 and a processing unit 47. After a system reset, the first word of a channel memory unit, i.e., channel memory 41(2) in FIG. 4A, transfers the first word in the queue to first position in the FIFO memory unit 46. The channel memory unit 41(2) is selected by programming of the second peripheral direct memory access unit 256Q. The address unit 43 applies control signals to the control terminals of multiplexer 42 coupling output signals of channel memory 41(2) to the first entry in the FIFO memory unit 46 of the high level data link controller 255Q. Each channel memory 41(1) through 41(M) has READ control line from the address 43 coupled thereto. The system reset results in the READ control line from address unit 43 to the channel memory 41(2), the same channel memory unit from which signal groups are transmitted by the multiplexer 42, is enabled. The reset signal by activating the enabled READ control line results in the transfer of first signal group in channel memory 41(2) to the first location in the FIFO memory unit 46. As shown in the processor 47, the processor includes an availability register 471. When a signal group added to the FIFO unit 46, a one is subtracted from the number of availability register 471. When a signal group is read from the FIFO unit 46, a one is added to the availability register 471. The processor also includes a size register 473, the operation of which will be described below.

Figure 4B:
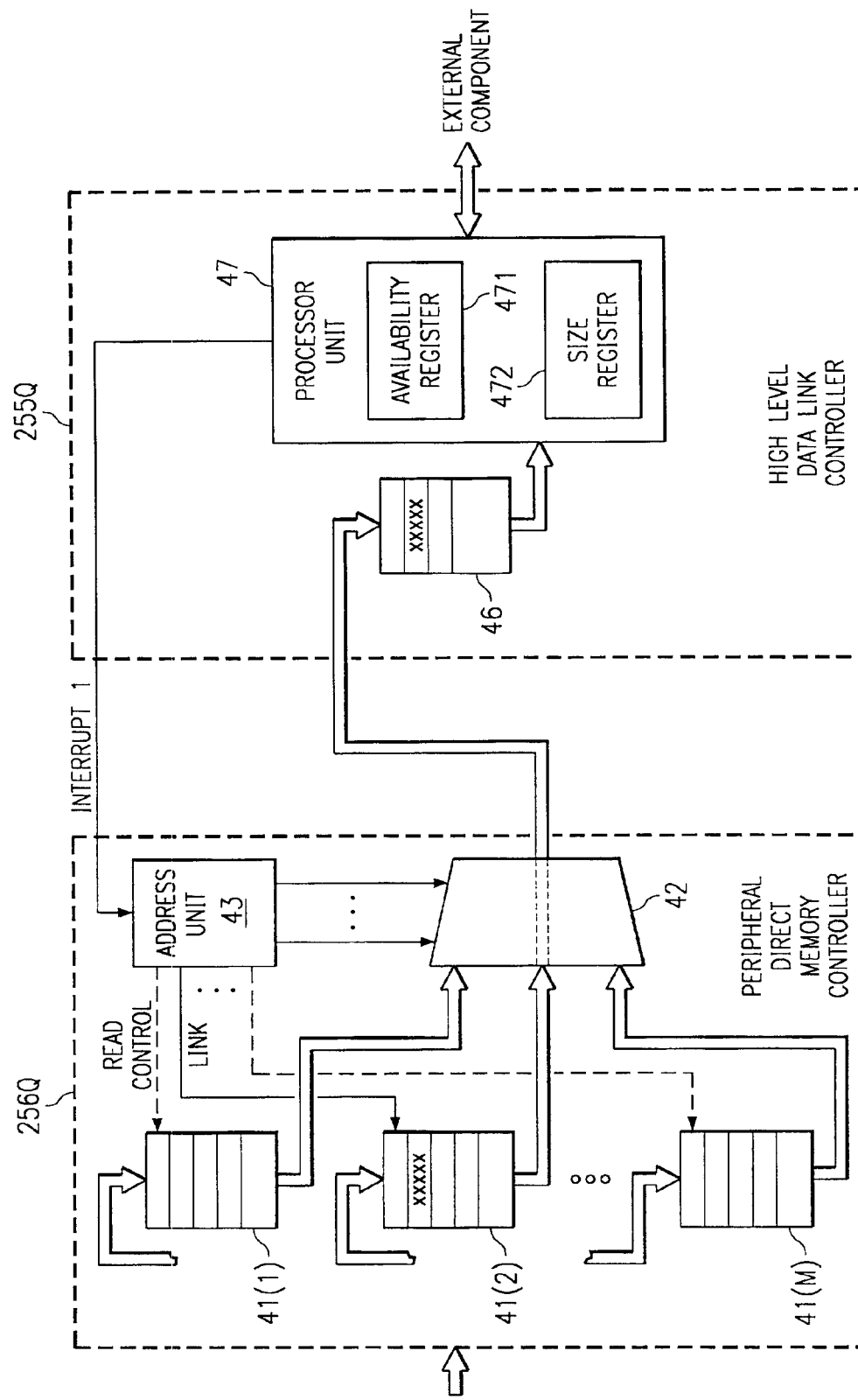
FIG. 4B illustrates the transfer of the next signal group according to the present invention.

Referring to FIG. 4B, the storage a signal group in the FIFO memory unit location has resulted in the availability register 471 being decremented by one. However, the availability register is greater than 0, there being locations available for storage of signal groups. When a signal group has been stored in the FIFO memory unit and the availability register 471 is greater than zero, i.e., a space in the FIFO register is still available for the storage of a signal group, an INTERRUPT 1 signal is generated by the processor 47 and applied to the address unit 43. In response to an INTERRUPT 1 signal, the read unit 43 signals the channel 41(2) to read the next stored signal group. The signal group in the second location of the channel memory 41(2) is transferred through the multiplexer 42 (i.e., the control signals applied to mulitplexer 42 have not changed) to the second location in FIFO memory unit 46. The storage of a signal group in the first FIFO memory location will automatically result in the next applied signal group being stored in the next available (second) location.

Referring to FIG. 4C, once again, the storage of the a signal group in the FIFO memory and the non-zero content of the availability register 471 result in a next INTERRUPT 1 signal being generated by the processor and applied to the address unit 43. As a result of the INTERRUPT 1 signal being applied to the address unit 43, the next (third) signal group of channel memory 41(2) is read from that location, transferred through multiplexer 42 and stored in the next free (third) memory location of the FIFO register 46. Thus, the storage of a signal group in the FIFO register and the availability of another location in the FIFO memory unit 46 results in the generation of an INTERRUPT 1 signal. The Interrupt 1 signal results in the transfer of the next signal group in the accessed channel memory to the FIFO memory.

While the FIFO memory unit has signal groups from the accessed channel memory of the peripheral direct memory access unit stored therein, the processor 47 is reading signal groups sequentially from the FIFO memory unit 47. Except for the first signal group (header) of each block of data, the signal groups read from the FIFO memory unit 46 are formatted and transmitted to external component, i.e., at the address in the second line of the data block as shown in FIG. 3. Thus, the FIFO memory unit 46 will seldom be filled. And when the FIFO memory unit is filled, the transfer of the next signal group is delayed. As soon as a location in the FIFO memory unit is 46 is available, the INTERRUPT 1 signal will be generated and the next signal group transferred from the channel memory 41(2) to the FIFO memory unit 46.

As indicated in FIG. 3, the first signal group in each data block includes the signal group identification number (ID) and the signal group size, i.e., the number of signal groups in the block of data. The first signal group in each block of data is not transmitted to the external component, but the identification number and the size are stored by the processor 47. The size number is stored in a size register 473. As each signal group from a currently-addressed block of data is stored in the FIFO memory unit 46, the number in the size register is decremented by 1. When the size register is equal to zero, a complete block of data has been transferred from a channel register and stored in FIFO memory 46. When the size register 473 is a zero value, an INTERRUPT 2 signal is generated by the processor 47.

Figure 4C:
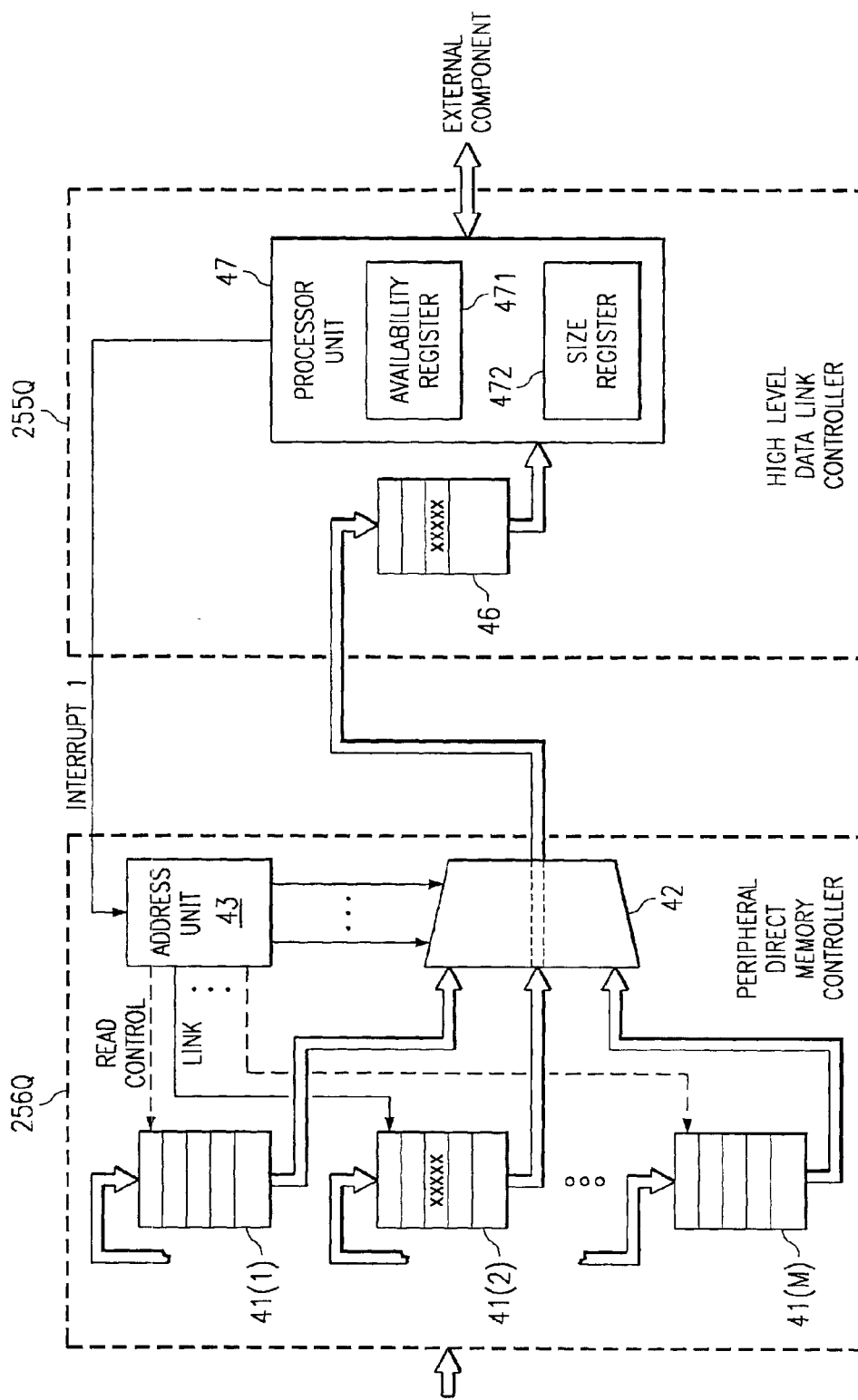
FIG. 4C illustrates the transfer of the third packet signal group according to the present invention.
Figure 4D:
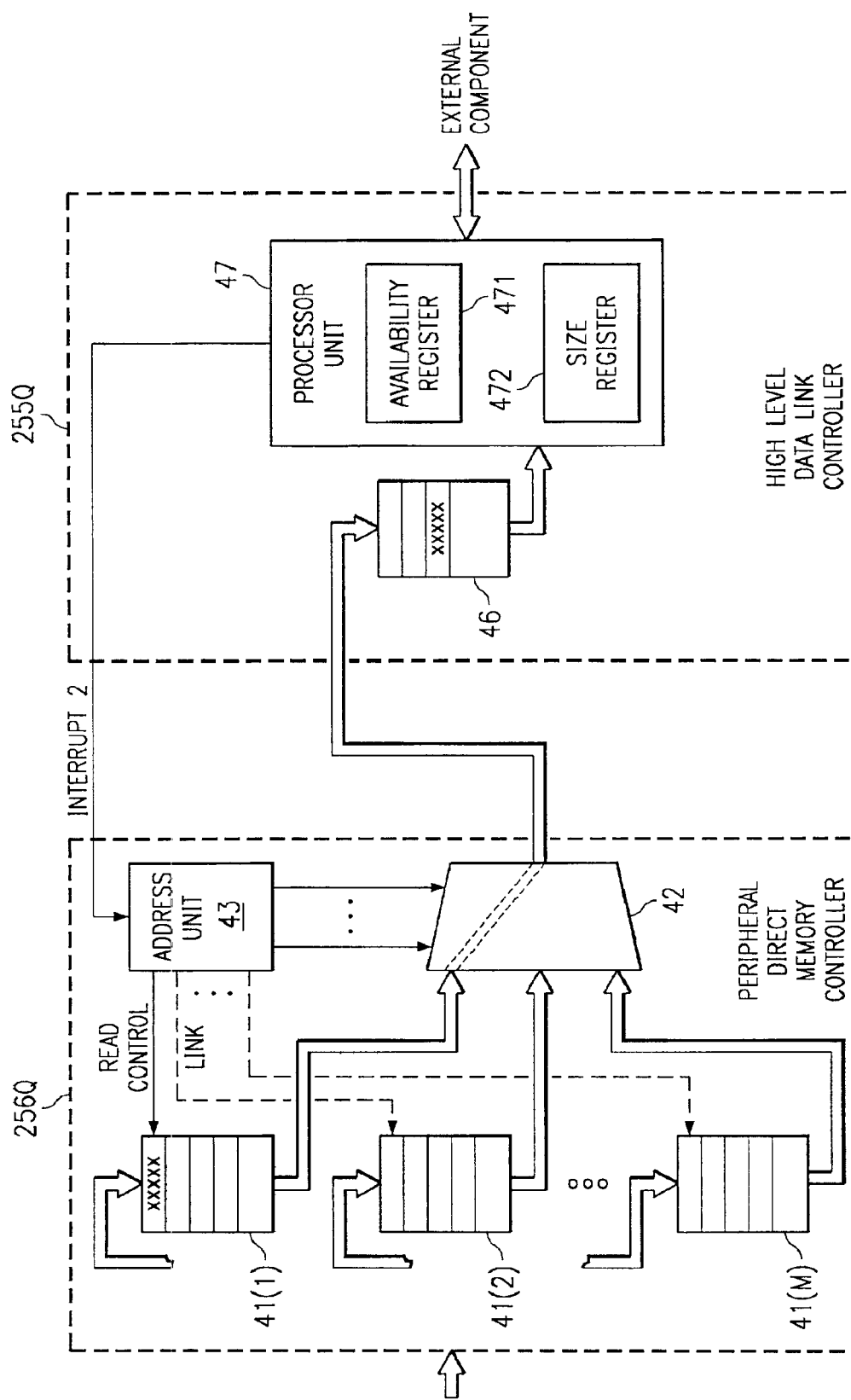
FIG. 4D illustrates the transfer of the last packet signal group according to the present invention.

Referring to FIG. 4D, the result of the generation of the INTERRUPT 2 signal is illustrated. The INTERRUPT 2 signal is applied to the address unit 43 of the peripheral direct memory access unit 255Q. As a result of the application of the INTERRUPT 2 signal, the control signals applied to the multiplexer 42 are altered. The result of the alteration is that a different channel memory unit is enabled for transmission through the multiplexer 42. As illustrated in FIG. 4C, the newly addressed channel memory is channel memory 41(1). Similarly, the READ control line is disabled with respect to channel memory 41(2) and enabled with respect to channel memory 41(1). Therefore, the presence of the INTERRUPT 1 signal will result in the next sequential unread location in the channel memory 41(1) being read and entered in the next available location in the FIFO memory 46. The first storage position of channel memory 41(1) is shown as having a signal group stored therein. This signal group is the next signal group to be transferred to FIFO memory 46.

In the preferred embodiment, the INTERRUPT 1 and the INTERRUPT 2 signals are synchronized with the same clock. Because the processor 47 can process and transmit signal groups as fast as the FIFO store the signals, an INTERRUPT 1 signal can be generated every clock cycle. The INTERRUPT 1 signal and the INTERRUPT 2 signal are generated simultaneously.

Figure 5:
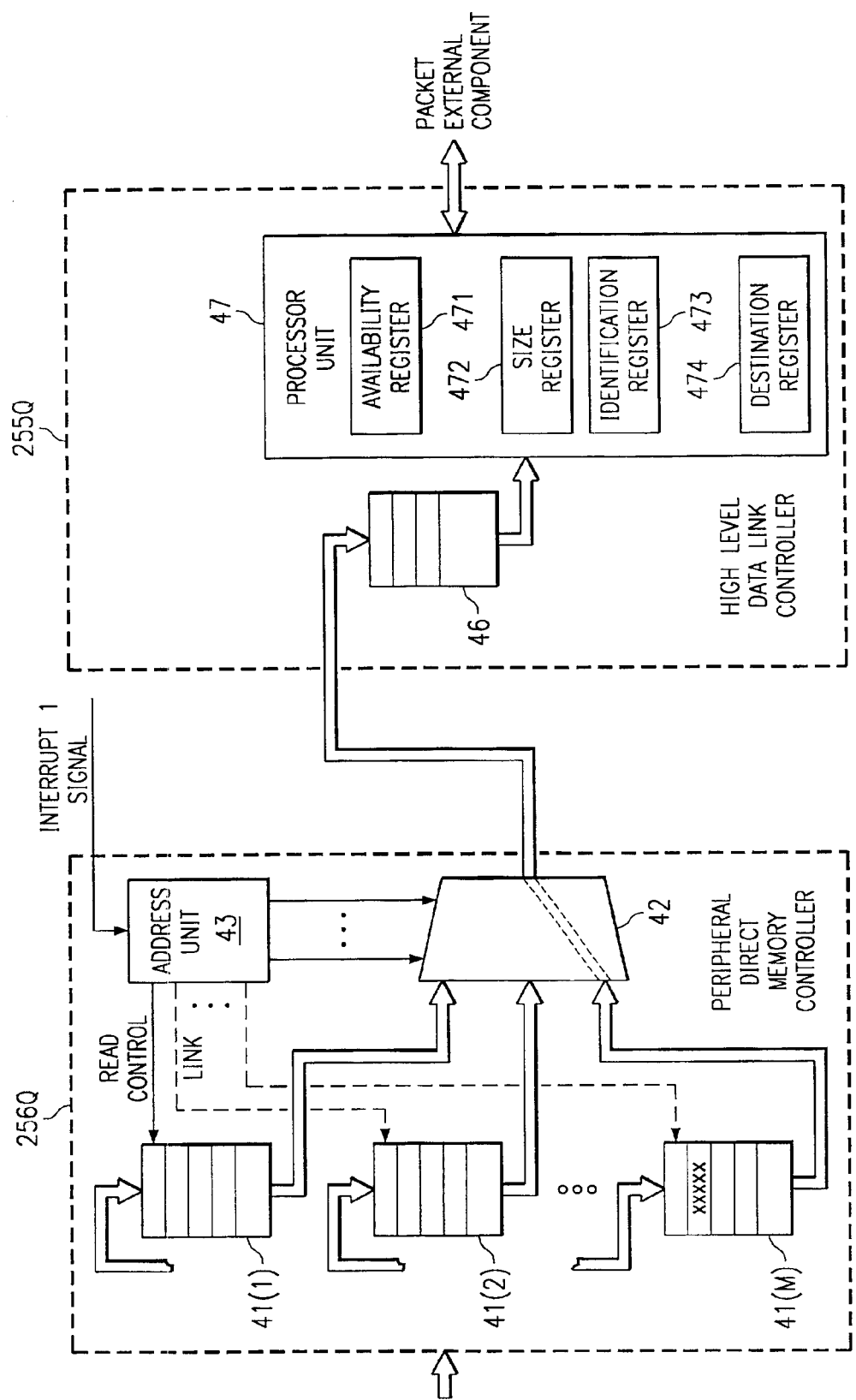
FIG. 5 is a block diagram illustrating the apparatus responding to an interruption in the data flow to the high level data link controller according to the present invention.

Referring to FIG. 5, the apparatus for responding to an interruption in the signals to the high level data link controller is shown. The second peripheral direct memory access controller 256Q includes a plurality of FIFO memory units 41(1) through 41(M). The address unit 43 provides control signals to the control terminals of multiplexer 42 to couple one of the FIFO memory units 41(1) through 41(M), 41(M) is illustrated in in FIG. 5, of the second peripheral direct memory access controller 256Q to the FIFO memory unit 255Q of the high level data link controller 255Q. The address unit 43, in response to an interrupt signal from the high level data link controller, causes the next memory location in FIFO memory unit 41(M) to be read and transferred through the multiplexer 42 to the next memory location in the FIFO memory unit 46. As signal groups are being entered in the FIFO memory unit 46, signal groups are being extracted from the FIFO memory unit 46 and being processed to be transmitted as a packet of signal. The signals of the packet are processed and transmitted to external apparatus. When the transmission of a new packet is begun, the identification number of the packet (register 473), the packet size (size register 472), and the packet destination address (register 474) of the packet are stored in the processor 47. As indicated above, the processor has an availability register 471 which indicates when a location is available in the FIFO memory unit 46 for the storage of signal groups. Similarly, the availability register 471 can indicate when the FIFO memory unit 46 is empty. However, once transmission of a packet has begun, the transmission of packet signals must be continuous.

In general, a location in the FIFO memory unit 46 is processed by the processor 47 every clock cycle. Similarly, the contents of a location of the addressed FIFO memory unit 41(1) through 41(M) are transferred to the FIFO memory 46 every clock cycle. When signal groups are not in a location in the FIFO memory 46 in a timely manner, an interruption will occur in the transmitted packet. This interruption is not permitted. The lack of a signal group in the FIFO memory unit 46 can be identified, for example, by a timeout procedure in the processor 47 or an empty location in the FIFO memory unit 46 in combination with non-zero contents of the size register 472 (indicating the packet has not been transmitted).

In response to the identification of the lack of available signal groups to complete a packet transmission, the processor sends an ABORT signal to the digital signal processor subsystem wherein the packet signal groups originated. The originating digital signal processor subsystem is identified by the identification number in identification register 474. The processor also transmits a signal group to the destination address, i.e., found in destination register 474, indicating that the previously transmitted signals should be disregarded. The FIFO memory unit 46 continues to receive the signals from addressed FIFO memory unity 41(M) even though the packet transmission has been aborted. The signal groups are still read by processor 47 from the FIFO memory unit 46. However, these signal groups are discarded. When the size register indicates that all the signal groups of the packet have been received by the processor, then the INTERRRUPT 2 signal is applied to the address register 43 and a new packet is processed. The INTERRUPT 2 signal can also be generated as the result of a time-out procedure in the event that the remaining signal groups of the aborted packet are never received by the second peripheral direct memory access unit 256Q.

2. Operation of the Preferred Embodiment

Referring once again to FIG. 1 and FIG. 2, rather than provide each subsystem with multi-channel buffered serial port unit, a peripheral component interconnect unit and a high level data link controller, these and selected components are fabricated on the chip, but not as part of the digital signal processor subsystems. In this mariner, using the switch 1, these components are shared. Signal groups are transferred from the memory unit of each digital signal processor subsystem to a channel memory unit of the peripheral direct memory access unit. Each channel memory is associated with at least one of the subsystems. The channel memories can be formed by partitioning a standard memory unit. Each channel memory is accessed on a first in first out scheme. Signal groups are transferred from the channel memory unit to the FIFO memory unit of the high level data link controller each time an INTERRUPT 1 signal generated in the high level data link controller is received by the peripheral direct memory access unit. The INTERRUPT 1 signal is generated when a signal group has been written into the high level data link controller FIFO memory unit and a location in the FIFO memory unit is available for storage of another signal group. The INTERRUPT 1 signal causes the storage in the FIFO memory unit of the next sequential signal group of a block of data following the storage of a signal group of the block of data causing the INTERRUPT 1 signal. When the last signal group of a block of data has been transferred to the FIFO memory unit, an INTERUPT 2 signal is generated. The INTERRUPT 2 results in the first signal group from a block of data stored in a preselected next channel memory to be transferred to the FIFO memory unit. In this manner, one processor subsystem can not monopolize the transfer of signals groups through the high level data link controller.

In the preferred embodiment, the processor of the high level data link controller can process a signal group every clock cycle. Similarly, the first interrupt signal can be generated every clock cycle. In addition, the transfer of signal groups from the peripheral direct memory access unit to the high level data link controller can occur every clock cycle. Consequently, the transfer of the signal groups according to the present invention can be very efficient.

In FIGS. 4A through 4D, the transfer of signal groups for each data block is illustrated as being from the first location in the channel memory. It will be clear that, in general, the actual location of the first signal group in a channel memory of a block of data will be determined by the first in-first out mode of operation of the channel memories.

An ABORT signal is generated when the high level data link controller is processing a packet and the next signal sequential group is not available for processing in a timely manner. The ABORT signal is forwarded to the digital signal processor subsystem identified by the header of the transmitted signal groups to take appropriate action. In the preferred embodiment, this ABORT signal is transmitted over a dedicated line. Only one digital processor subsystem receives the ABORT signal. A message is sent notifying the component receiving the packet generated by the high level data link controller that the packet should be ignored. The peripheral direct memory access controller continues to transfer the signal groups to the FIFO memory unit even though the high level data link controller will not use these signal groups. In this manner, the FIRST and SECOND INTERUPT signals act in a manner similar to the absence of the ABORT signal and can proceed to the next signal group to be processed by the high level data link controller.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A data processing system comprising:
   a plurality of digital signal processor subsystems, each subsystem including:
      a digital signal processor, and
      a memory unit;
   a peripheral direct memory access unit coupled to the memory unit of each subsystem, the peripheral direct access memory having a plurality of memory subunits, each memory subunit receiving signal groups from at least one of the processor subsystems; and
   a high level data link controller, the high level data link controller including:
      FIFO memory unit, the FIFO memory unit storing sequences of signals groups, and
      a processor, the processor reading a sequence of signal groups from a the FIFO memory unit and transmitting the sequence of signal groups as a signal packet, the processor unit providing an ABORT signal to the processor generating a packet currently being transmitted by the processor when the next sequential signal group is not available in the FIFO memory unit a timely fashion for transmission with the packet.

2. The data processing system as recited in claim 1 wherein, when the ABORT signal is generated, a message is sent indicating that the previously transmitted packet should be ignored.

3. The data processing system as recited in claim 1 wherein after the generation of the ABORT signal, signal groups associated with the packet continue to be transferred from the peripheral direct memory access unit to the FIFO memory unit.

4. The data processing system as recited in claim 3 wherein the signal groups transferred to the FIFO memory unit after the ABORT signal are removed from the FIFO memory unit and discarded.

5. The data processing system as recited in claim 4 wherein processor sends a SECOND INTERRUPT signal to the peripheral direct memory access unit after all the signal groups associated with a packet have been transferred to the FIFO memory unit, the SECOND INTERRUPT signal resulting in signal groups associated with a different packet being transferred to the FIFO memory unit.

6. The data processing system as recited in claim 5, the peripheral direct memory unit having a plurality of channel memories, wherein the processor applies a FIRST INTRRUPT signal to peripheral direct memory access unit to transfer a signal group from a channel memory to the FIFO memory unit.

7. In a data processing system having a plurality of digital signal processor subsystems, a method of transferring a sequences of signal groups from a peripheral direct memory access unit to a high level data link controller, the method comprising:

associating each digital signal processing unit with a one of a plurality of channel memories in the peripheral direct memory access unit:

transferring sequences of signal groups from the digital signal processors to the associated channel memory transferring the signal groups to a FIFO memory unit in the high level data link controller for processing and transmission as a packet; and generating an ABORT signal when a signal group is not available for processing as a packet in the FIFIO memory unit.

8. The method as recited in claim 7, the method further comprising:
   applying the ABORT signal to the digital processor system generating the signal groups being processed as a packet.

9. The method as recited in claim 8, the method further comprising:
   transmitting a signal group indicating that the transmitted packet portion should not be processed by the receiving apparatus.

10. The method as recited in claim 8, the method further comprising:
    in response to a SECOND INTERRUPT signal, selecting a one of the channel memories;
    in response to a FIRST INTERRUPT signal, transferring a first signal group of a sequence from the channel memory selected by the SECOND INTERRUPT signal to the a FIFO memory unit in the high level data link controller;
    when a signal group has been transferred to the FIFO memory unit and the FIFO memory has an empty location, generating a next FIRST INTERRUPT signal, the next FIRST INTERRUPT signal causing a next sequential signal group to be transferred from the selected channel memory to the FIFO memory unit;
    continuing to generate a next FIRST INTERRUPT signal until all the signal groups of a packet are transferred to the FIFO memory after generation of an ABORT signal.

11. In a data processing system having plurality of digital signal processor subsystems, an interface unit for transferring packets of signal groups from the digital signal processor subsystems to an external component, the interface unit comprising;
    a peripheral direct memory access unit, the peripheral direct memory access unit including;
       a plurality of first in-first out channel memories; each channel memory coupled to and receiving a sequence of signal groups from at least one digital signal processor subsystem, and
       a multiplexer coupled to the channel memories for transmitting signal groups from a location in a channel memory, the channel memory being selected by control signals applied to the multiplexer; and
    a high level data link controller including;
       a FIFO memory receiving signal groups from the multiplexer: and
       a processor, the processor reading signal groups from the FIFO memory and applying processed signal groups to the external component as a packet, wherein the processor generates an ABORT signal when a signal group is not available for processing in the FIFO memory unit.

12. The interface unit as recited in claim 11 wherein the ABORT signal is applied to the digital processor subsystem generating the signal groups being processed by the high level data link controller.

13. The interface unit as recited in claim 12 wherein a message is sent to the external component to which the packet is addressed after generation of an ABORT signal.

14. The interface unit as recited in claim 13 wherein the processor generates a FIRST INTERRUPT signal when a signal group is stored in the FIFO memory and a location in the FIFO memory is available for storage, the FIRST INTERRUPT signal causing a next signal group in a packet in the channel memory selected by the control signals to be stored in the FIFO memory unit, the FIFO memory unit continuing to receive signal groups for the packet that caused the ABORT signal.

15. The interface unit as recited in claim 14 wherein when the last signal group of a sequence of signal groups is stored in the FIFO memory unit, a second interrupt signal is generated by the processor, the second interrupt signal changing the control signals wherein signal groups from a new channel memory are stored in the FIFO memory.

* * * * *